No. 699,741. Patented May 13, 1902.
L. A. & L. J. BACHUS.
EYEGLASSES.
(Application filed Jan. 13, 1902.)

(No Model.)

Witnesses

Inventors
L. A. Bachus
L. J. Bachus
By
Attorneys

UNITED STATES PATENT OFFICE.

LUCIUS A. BACHUS AND LUCIUS J. BACHUS, OF LOUISVILLE, KENTUCKY.

EYEGLASSES.

SPECIFICATION forming part of Letters Patent No. 699,741, dated May 13, 1902.

Application filed January 13, 1902. Serial No. 89,494. (No model.)

*To all whom it may concern:*

Be it known that we, LUCIUS A. BACHUS and LUCIUS J. BACHUS, citizens of the United States, residing at Louisville, in the county of Jefferson and State of Kentucky, have invented certain new and useful Improvements in Eyeglasses; and we do declare the following to be a full, clear, and exact description of the invention, such as will enable others skilled in the art to which it appertains to make and use the same.

This invention relates to improvements in eyeglasses, and particularly to that class of eyeglasses having adjustable nose-guards extending beyond the plane of the lenses to increase their extent of bearing-surface and security of engagement with the nose.

The object of the present invention is to provide an improved construction and arrangement of spring and guards, whereby the spring is rendered less conspicuous and a neater appearance obtained, an accurate and comfortable fit insured, and the lenses maintained at all times in proper position.

With this and other objects in view the invention consists of certain novel features of construction, combination, and arrangement of parts, which will be hereinafter more fully described, and particularly pointed out in the appended claim.

Figure 1:
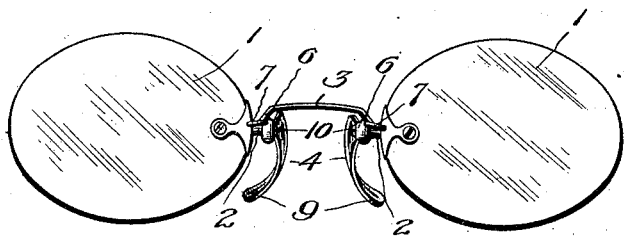
Figure 2:
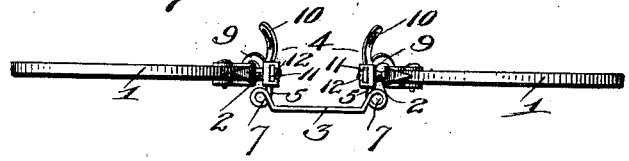
Figure 3:
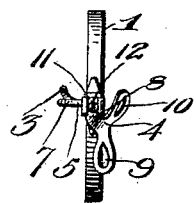
Figure 4:
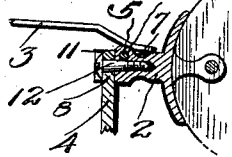

In the accompanying drawings, Figure 1 is a front view of a pair of eyeglasses embodying the invention. Fig. 2 is a top plan view of the same. Fig. 3 is a section through the spring looking in the direction of one of the guards and lenses; and Fig. 4 is an enlarged detail section through one of the studs, showing the means for fastening the guard and spring.

Referring now more particularly to the drawings, 1 represents the lenses or glasses; 2, the studs or clamping-posts; 3, the bowed pressure-spring, and 4 the guards.

The spring 3 is disposed horizontally in advance of the plane of the lenses and has a slight upward bow or curvature to permit the lenses to have movement in a vertical plane in adjusting the eyeglasses upon the nose of the wearer. The ends 5 of the spring project rearwardly and are seated in transverse openings 6, formed in the studs 2, and at the intersection of the right-angularly-bent ends of the spring with the bowed body portion thereof are formed horizontal coils 7, which permit the lenses to have movement in a horizontal plane in adjusting the glasses in position. By thus adapting the lenses to yield both vertically and horizontally the wearer is enabled to adjust the glasses more comfortably and satisfactorily to suit the contour of the nose, while at the same time the pressure of the spring is exerted in two different planes to hold the guards in firm engagement with the nose. By this means a weaker spring than is ordinarily employed may be used and a better clamping action obtained, thus relieving the wearer of the discomfort sometimes produced by the severe pinching action exerted where the pressure is solely in one plane directly against the sides of the nose.

Each guard 4 consists of a shank or body portion 8 and two ovate wings 9 and 10, the wings preferably being of open or skeleton form. The shanks 8 are fitted in suitable seats 11 on the studs and are secured by screws 12, which also intersect the openings 6 and impinge against the ends 5 of the spring, thereby removably connecting both the spring and the guards to the studs. It will be noted that the wings 9 of the guards lie substantially in the plane of the lenses, while the wings 10 extend upwardly and rearwardly at an oblique angle, thus adapting each guard to bear at a point low down on the nose and at a higher point adjacent to the hollow of the eye, thus distributing the pressure and adapting the glasses to maintain a horizontal position on the nose. The guards are made of thin metal or some other suitable pliable material to enable them to be easily bent or "set" by the optician to conform to the peculiarities of a nose, and the wings are of ovate skeleton form to give them a sufficiently long bearing-surface and to allow the skin to seat therein to increase the holding action. The two upper wings of the guards are pressed inwardly under the action of the spring-coils and the two lower wings under the action of the body portion of the spring, so that the pressure is distributed in the most effective manner to cause least discomfort to the wearer.

The invention is alike adapted for rimmed and rimless glasses.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described our invention, what we claim, and desire to secure by Letters Patent, is—

In eyeglasses, the combination of lenses, studs having threaded longitudinal sockets and intersecting transverse openings, guards, each having a shank and projecting wings, a spring having an upwardly-bowed center and rearwardly-extending ends formed with horizontal coils and entering said transverse openings, and screws passing through the shanks of the guards and entering the threaded sockets of the studs to secure the guards thereto, and impinging against the ends of the springs to hold the same seated in said openings, substantially as set forth.

In testimony whereof we have hereunto set our hands in presence of two subscribing witnesses.

LUCIUS A. BACHUS.
LUCIUS J. BACHUS.

Witnesses:
E. H. LUTZ,
JOHN KRAFT.